3,269,888
METHOD OF APPLYING SILICATE TO WET ASBESTOS-SLAG CEMENT SHEETS AFTER FORMATION BUT PRIOR TO CONSOLIDATION OF SUCH SHEETS
Julie Chi-Sun Yang, Somerville, N.J., assignor to Johns-Manville Corporation, New York, N.Y., a corporation of New York
Filed Dec. 24, 1963, Ser. No. 332,998
7 Claims. (Cl. 162—119)

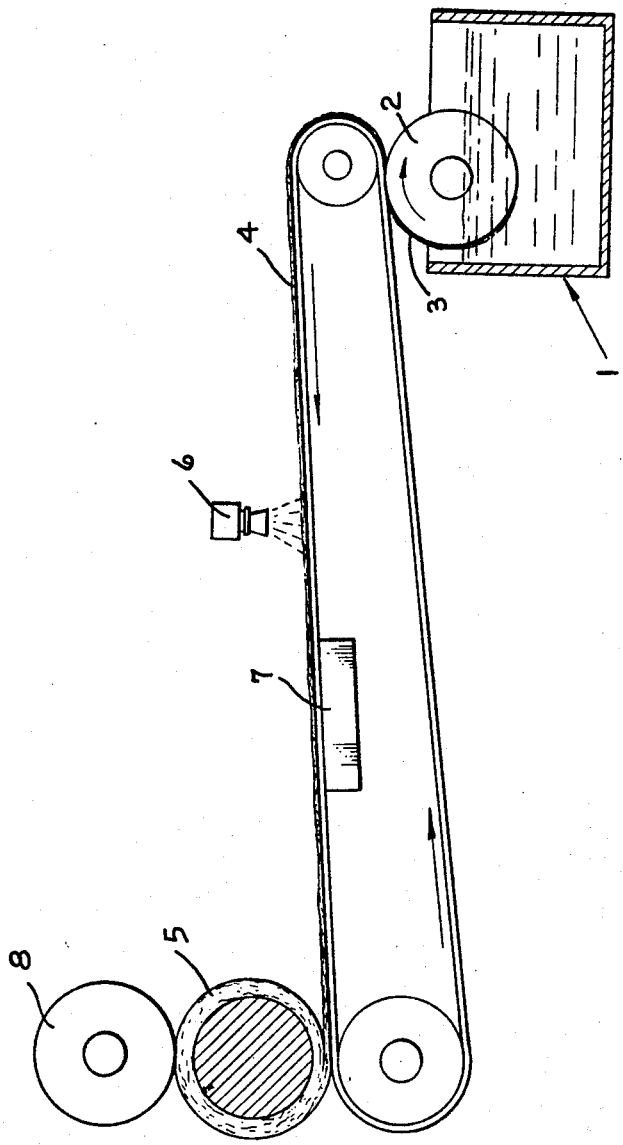
Aug. 30, 1966  JULIE CHI-SUN YANG  3,269,888
METHOD OF APPLYING SILICATE TO WET ASBESTOS-SLAG CEMENT SHEETS
AFTER FORMATION BUT PRIOR TO CONSOLIDATION OF SUCH SHEETS
Filed Dec. 24, 1963
INVENTOR.
JULIE CHI-SUN YANG
BY
ATTORNEY

United States Patent Office 3,269,888
Patented August 30, 1966

This invention relates to the manufacture of asbestos-cement products, and more particularly to an improved means for the manufacture of asbestos-cement products comprising hydraulic setting slags and the products thereof.

The relatively low cost of asbestos-cement materials and the effective and economical forming processes or techniques for the production of asbestos-cement products together with the outstanding physical properties of the resulting articles such as high strength and inorganic composition with their inherent resistance to the elements, etc., has resulted in the extensive utilization over the years of asbestos-cement materials and procedures for the manufacture of a variety of common products therefrom including, for example, pipe or conduit, building boards or sheets for siding, sheathing, interior walls and finishes, furniture, etc., and shingles for roofing or siding, among numerous other applications. Typical compositions or furnishes for the commercial manufacture of products of this category substantially exclusively comprise the common Portland type of hydraulic setting cements as the only or the principal cementitious binder component or phase. This substantially exclusive use of the Portland type hydraulic cement is apparently primarily due to its fast hydration and relative high early or initial strength characteristics which are more consonant and amenable to conditions or requirements of the conventional or most commonly utilized asbestos-cement manufacturing process comprising the so-called Hatschek or wet process technique.

Briefly, this common asbestos-cement manufacturing process involves dispersing the asbestos and cement, etc., furnish materials in a water medium providing a dilute slurry, collecting or depositing the solids content from the slurry in the form of a thin wet sheet and superimposing or building up layers thereof upon one another and consolidating the composite mass to integrate the layers and provide a product of apt thickness and density. This type of process is illustrated by the Hatschek U.S. Letters Patent No. 769,078 and Reissue 12,594, and more recent techniques and/or means therefor by U.S. Letters Patent No. 2,182,353, No. 2,246,536, and No. 2,322,592.

The relatively fast hydration and setting rate of the Portland type of cements and their high early or initial strength have comprised a major factor in the commercial application of asbestos-cement products in enabling the low cost production of asbestos-cement articles including pipe and other intricately shaped items by means of conventional wet process machines and techniques at high economically feasible forming machine and handling speeds or production rates with high product recovery, including the initial forming or shaping of the item on an accumulator roll or mandrel followed by the prompt removal of the material therefrom substantially without deformation, sag, warpage, etc.

Slag cements, or more specifically the common class of hydraulic setting cements prepared from or incorporating major proportions of granulated, finely divided blast furnace slags or modifications thereof, are markedly superior in resistance to acids and generally to chemicals and aggressive soils or environmental conditions over Portland type cements, as well as being substantially lower in costs. However, notwithstanding such advantages, this class of cements had not heretofore been found suitable for the commercial or economical production of asbestos-cement articles when employed with common wet process forming means and techniques due, among other reasons, to their inherent tendency to sag or otherwise deform out of shape during production and handling.

It is the primary object of this invention to provide an effective and economical means of producing asbestos-slag cement products.

It is also a primary object of this invention to provide means of utilizing finely divided hydraulic setting slags in the conventional manufacture of asbestos-cement products utilizing common wet process forming machines and techniques.

It is a further object of this invention to provide means of producing low cost, acid resistant asbestos-slag cement products having strength properties comparable to like asbestos-Portland cement products, and for manufacturing such products incorporating hydraulic setting slags as the principal cementitious binder utilizing substantially the same economically feasible conditions as in comparable asbestos-Portland cement methods.

It is a still further object of this invention to provide means of manufacturing pipe and the like hollow cylindrical bodies and conduit or containers from asbestos-cement furnishes comprising hydraulic setting slags as the major cementitious or binder component wherein the green or uncured article or product such as a pipe section resists sag or deformation and maintains or preserves its shape or configuration upon forming, in removal from the forming means such as a mandrel, and/or in subsequent handling when produced according to normal wet process means and conditions.

It is also an object of this invention to provide means of effectively and economically manufacturing low cost pipe and the like products from asbestos-cement furnishes comprising hydraulic setting slag as the predominant cementitious component which have high strength and acid resistance, and to provide the improved products thereof.

It is also an object of this invention to provide means of enabling the use of relatively low cost hydraulic setting slags in the manufacture of asbestos-cement products which in turn permits the utilization of greater proportions of silica in the stock and thereby furthering the savings in material costs, without any substantial degrading of physical and/or chemical properties.

Other objects and advantages of this invention will be apparent from the detailed description given hereinafter, and it should be understood that the detailed description, while indicating preferred embodiments of the invention, is given by way of illustration only as variations and modifications within the spirit and scope of the invention will become apparent from the following detailed description.

The figure of the drawing comprises a schematic diagram illustrating a suitable means or device for the effective practice of this invention with a conventional wet process asbestos-cement forming machine and procedure.

Sodium silicate, of course, has heretofore been proposed for and/or utilized in the treatment of asbestos and/or cement materials as by adding a solution thereof to a suspension or slurry of asbestos and/or cement furnish or stock to induce or produce a number of varied effects including its application as a binder or adhesive, waterproofing material, flocculation agent, accelerator for the setting of cement, etc. For example, U.S. Letters Patent No. 1,872,480 shows the addition of sodium silicate as a flocculating agent to an asbestos-cement slurry to flocculate the cement. However, as with many other known additives, the utilization of sodium silicate with hydraulic setting cements and/or in asbestos-cement manufacturing processes, although sometimes effective in a particular function, entails undesirable and disadvantageous characteristics or effects such as filling or clogging the porous felt belts utilized in the wet process in the manufacture of asbestos-cement products destroying the essential permeability of the belts and thereby rendering them useless, in accumulating and building up in concentration in the asbestos-cement wet process system and in turn adultering and/or degrading the products due to the adverse effects of sodium silicate upon the strength of hydraulic setting cements, in general effecting erratic action or results in hydraulic setting cement compositions, corroding equipment, etc., among other deleterious results such as set forth in U.S. Letters Patent No. 2,987,407. Moreover, notwithstanding certain specific desirable or useful properties and effects known, and extensive investigations or experimentations with sodium silicate or the like materials in asbestos and/or cements, the disadvantages inherent in so utilizing sodium silicate have prohibited its application in commercial processes.

The present invention, on the other hand, comprises means of utilizing sodium silicate whereby highly useful and advantageous effects are derived therefrom without encountering or imparting the normal or inherent deleterious effects or results of this material such as a substantial reduction in strength of hydraulic cement products, the build up of concentration or accumulation thereof in the slurry or system and in turn clogging or plugging of the machine felt in conventional wet process machines, etc. Moreover, in addition to avoiding or eliminating the undesirable aspects of sodium silicate in hydraulic cement compositions, the means of this invention decidedly enhance or amplify certain useful and advantageous effects of sodium silicate over and beyond those heretofore derived therefrom to the extent of at least about a 20% up to about 50% increase in effectiveness as will be apparent from direct comparisons of means set forth hereinafter.

In general, this invention comprises the discovery that hydraulic setting slag cements can be utilized in asbestos-cement compositions or furnishes in conventional wet process asbestos-cement manufacturing machines and procedures at economical and normal machine speeds or production rates and conditions while resulting in high recoveries of products having adequate physical properties comparable to those of typical like asbestos-Portland cement products and of enhanced chemical properties through the means of minor amounts of sodium silicate in solution applied substantially uniformly to the asbestos-cement furnish materials while wet and at a point subsequent to their withdrawal from the furnish or stock tank but prior to their build up or lamination and consolidation to a depth or into a mass of apt dimensions. More specifically, in a typical wet process asbestos-cement type machine or procedure to which this invention applies, the sodium silicate solution is applied to the wet sheet-like body or layer of stock materials formed by withdrawing and/or depositing the solids and entrained water from the slurry prior to the accumulation and integration thereof as by rolling or revolving the sheet or layer of materials upon themselves on a roll or mandrel, normally under pressure.

To facilitate its application and activity or effectiveness the sodium silicate agent is applied to the wet asbestos-cement stock in the form of an aqueous solution, a medium which is compatible with the asbestos-cement system. Sodium silicate materials suitable for this application comprise any one of the common or commercial grades having, for example, sodium oxide to silica ratios ranging from about 1.60 to 3.75 mols of $SiO_2$ per mol of $Na_2O$. The sodium silicate dissolved or dispersed in water in apt or handleable amounts, such as concentrations up to about 20% by weight, can be applied to the wet asbestos-cement furnish or stock in quantities or at rates to provide at least approximately 0.125, up to approximately 5% by weight of sodium silicate solids based upon the total weight of the solids of the asbestos-cement furnish or stock including silica, fillers, etc., and preferred amounts for typical hydraulic setting slag cement containing formulas are approximately 0.8 to 1% of sodium silicate solids per solids of the furnish. Excesses of sodium silicate tend to produce deleterious effects and/or adulterate the ultimate products such as diminishing the strength and/or inducing erratic setting therein and therefore should be avoided. For most applications amounts in excess of about 2% sodium silicate solids are normally unnecessary and possibly undesirable. Moreover, although substantially any concentrations of sodium silicate and water can be utilized in practicing this invention since the wet asbestos-cement furnish or stock normally contains an excess of water at the point of application, concentrations of less than about 1% of sodium silicate simply entail the addition of excesses of water which must be subsequently removed while concentrations in excess of about 20% of sodium silicate involve rather viscid solutions which may present difficulties in applications such as the clogging of spray equipment, etc. Typically suitable solution concentrations for most means of application and maximum ease of control comprise about 3 to 10% by weight of sodium silicate solids. Appropriate techniques or means of applying solutions of the sodium silicate agent include spraying, overflow, or the like feed troughs or distributors, roll applications, or any conventional or typical means or techniques of adding or feeding a uniform or controlled amount of solution wherein the concentration and/or amount of solution can be effectively coordinated with the quantity of stock and/or machine speed or rate of formation. Preferred means consist of spray apparatus which provide an atomized or finely divided spray and permit or facilitate a controlled uniform application.

An example of an effective and preferred means or technique for applying a sodium silicate solution in a typical wet process asbestos-cement operation is the arrangement or system schematically diagrammed in the drawing. The illustrated system of the drawing and operation thereof are as follows. A dilute aqueous suspension or slurry, of for example about 10 to 20 parts by weight of water per part of solids of the asbestos-cement furnish or stock formulation, is provided and maintained in cylinder mold vat or tank 1. Cylinder filter mold 2, positioned partially submerged within vat 1, rotates while the water of the suspension or slurry, normally induced by the application of subatmospheric pressures within the cylinder mold, passes through the wire screen or foraminous facing the cylinder mold causing the deposition and retention of the solids phase or content of the aqueous suspension on the surface of the cylinder mold screen forming a thin sheet or layer thereon of the solids as shown at 3.

The rotating cylinder mold 2 is in continuous contact with a moving endless conveyor comprising a porous felt 4 and the asbestos-cement slurry solids retained on the face of the cylinder mold are continuously transferred to the moving porous felt 4 as the felt comes into contact with the face of the cylinder. The conveyor belt or felt 4, carrying the wet sheet of stock deposited thereon, continuously moves to the accumulator and forming roll or mandrel 5, and at a location intermediate the cylinder mold 2 and the accumulating or forming roll 5, an appropriate means such as spray device 6, or other equivalent applicator, administers the sodium silicate solution to the wet sheet of stock. Following the application of the sodium silicate solution, the conveyor belt passes over a suction box 7 whereby the reduced pressures withdraw water from the wet sheet and in turn draw the sodium silicate down through the mass of the sheet of stock. Next, the conveyor continues carrying the still damp sheet of stock containing the sodium silicate into contact with the accumulating and forming roll or mandrel 5 where the sheet of stock is transferred from the moving conveyor felt to the roll and at the same time is spirally wound or convoluted upon the roll and/or itself forming a laminated body which is consolidated by pressure from press roll 8 integrating the layers into a monolithic-like mass.

The following examples illustrate the marked reduction in sag or deformation of green, unhydrated or unset asbestos-cement compositions comprising a hydraulic setting slag as the major cementitious component due to the means of this invention among other desirable and decided advantages thereof and the over-all effects of this means in relation to other or prior techniques, as well as preferred and typical procedures or means for the effective and economical manufacture of asbestos-cement pipe and the like products with conventional equipment and conditions from low cost formulations comprising hydraulic setting slags, and the improved, chemical resistant products thereof. It is to be understood that the specific techniques or means, conditions, materials and/or proportions thereof and asbestos-cement formulations are merely exemplary and not to be construed to limit the invention in any particular details recited in these examples.

To expedite and control the testing and evaluation of the means of this invention and to provide reproducible or like circumstances therefor, and for comparison with other agents, conditions, formulations, etc. of a degree of standardization and/or regulation not practical or possible in many instances with large scale or production equipment, a standardized test was adopted for the development and exploration of this invention. This test, referred to hereinafter as the "sag cake test" and comprising the means of evaluating and obtaining the data and relative results set forth in certain of the following examples, was applied under identical conditions, and each illustration thereof set forth in the examples, unless specified otherwise, was performed pursuant to the following procedure.

SAG CAKE TEST

The basic steps of this test are put into effect or carried out according to a predetermined time schedule as given, and an appropriate timing mechanism is employed in connection therewith. Initially, a dry, thoroughly mixed (10 minute agitation) 150 gm. sample of stock of the particular asbestos-cement formulation to be evaluated is prepared for each cake test, and added to 1000 milliliters of distilled water with the mixing thereof commencing immediately at 0:00 minutes. After mixing 1:00 minute, the wet admixture of stock is promptly transferred to a vacuum filter box measuring 3 in. x 8 in. and having a bottom perforated plate of like dimensions covered with filter paper, and at 1:15 minutes a vacuum is applied to the filter box. The vacuum should be such as to register 16 in. of mercury during removal of water and between 13 and 13.5 in. of mercury thereafter throughout the remainder of the filtering operation which continues for a duration of 3 minutes and 45 seconds. Upon withdrawal of the excess water a 25 lb. hand tamp is placed on the top of the cake for 10 seconds to smooth its upper surface, and at 5:00 minutes the vacuum is removed. In the 5:00 to 6:00 minute interval the cake is removed from the filter box and in the 6:00 to 6:30 minute interval the cake is weighed. From 6:30 to 7:05 minutes the cake is placed in a press and then consolidated at a pressure of 320 p.s.i. applied across the entire 3 in. x 8 in. cake surface over 10 seconds at a uniform rate of loading using 3 to 4 strokes to reach maximum load. The application of pressure should start at about 6:50 minutes with maximum load being reached at 7:00 minutes and maintained until 7:05 minutes. From 7:05 to 9:00 minutes the press cake is again weighed and then set up for the sag test.

Next, the cake is prepared for measuring its sag or deviation from horizontal under a given load by placing the 3 in. x 8 in. cake across anvils positioned at each end of a base sheet providing an intermediate 6 in. free span and with a releasable center support to hold the test cake horizontally across the span between the anvils before the test is started. A foot or base of a gauge micrometer with an added dead weight of 140.0 gms. is mounted centrally between the anvils and positioned on the upper surface of the sag cake. The micrometer reading is taken to determine the thickness of the cake and as a basis for the subsequent sag measurement. At 9:00 minutes the center support between the anvil holding the intermediate section of the cake is released and a reading on the micrometer taken at 10:00 minutes and/or at other subsequently specified intervals. This reading is subtracted from the initial reading giving the sag or deviation from the horizontal due to the combined weight of the cake itself and the load applied from the micrometer assembly.

Upon completion of the sag measurement the cake is removed from the tester and carefully straightened on a flat plate and placed for 24 hours in a moisture cabinet held at 90±3° F. and at least 90% relative humidity. This is followed by 16 hours in an autoclave at 100 p.s.i. saturated steam (337.8° F.). After the curing cycle the cake is cooled to room temperature and submerged for 24 hours in fresh water at 73±3° F., removed and the saturated cake weight determined in both air and water. Then the flexural strength of the cake is determined in accordance with ASTM Specification C–223–55 on a suitable testing device having a test span of 6 in. and the breaking load recorded. Last, the broken cake is placed in a ventilated oven at 212 to 220° F. and dried for 48 hours, cooled in a desiccator and the dry weight determined for use in water absorption and density calculation.

*Example 1*

A series of samples of like asbestos-cement formulations comprising a hydraulic setting slag as the principal cementitious component, were evaluated and compared by submitting each to the above described sag cake test under varying conditions including a control sample with no sodium silicate treatment, the admixing of a solution of sodium silicate in with the aqueous slurry of the asbestos-cement formulations or stock samples pursuant to the disclosures of the prior art, and pursuant to this invention, the pouring of a solution of sodium silicate over formed sag cake samples in the filter box while under vacuum to simulate the application of a solution of sodium silicate to the wet sheet on a forming machine prior to traversing the suction box and formation of the product on the accumulating roll or mandrel. The asbestos-cement stock formulation or slurry solids consisted in each case of 20% by weight asbestos fiber, 40% by weight silica, 10% by weight Portland cement, and 30% by weight of hydraulic setting slag. The sodium silicate was "N" grade (a product of Philadelphia Quartz having a ratio $$1(Na_2O):3.22(SiO_2)$$

approximate solution viscosity of 1.8 poises, and specific gravity of 41.0° Bé.) mixed as a 1% solution. The constant and variable conditions and effects thereof were as given hereinafter in Table I.

TABLE I.—SODIUM SILICATE TRATEMENT OF ASBESTOS-CEMENT AND EFFECTS OF THE APPLICATION

| Percent Sodium Silicate [1] and Method of Application | Number of Samples | Silica Cement Ratio | Filter Time, Sec. | Water Retention Percent | | Sag in Inches | Sag Reduced in Inches Over Control | Percent Sag Reduced Over Control | Percent Improvement Over Silicate in Stock Slurry | Break Load Pounds | Thickness in Inches | Dry Density, pcf. |
|---|---|---|---|---|---|---|---|---|---|---|---|---|
| | | | | Filtration | Press | | | | | | | |
| None, control | 3 | 1.0-1 | 77 | 41.9 | 28.7 | .165 | | | | 107.9 | .298 | 83.7 |
| 0.5% sodium silicate in stock slurry | 3 | 1.0-1 | 66 | 53.3 | 33.8 | .112 | 0.53 | 32.0 | | 104.4 | .277 | 79.8 |
| 1.0% sodium silicate in stock slurry | 3 | 1.0-1 | 57 | 57.9 | 36.7 | .079 | 0.86 | 52.0 | | 102.6 | .288 | 76.7 |
| 1.5% sodium silicate in stock slurry | 3 | 1.0-1 | 65 | 58.9 | 38.1 | .064 | 0.101 | 61.0 | | 113.7 | .318 | 75.9 |
| 0.5% sodium silicate poured over formed sag cake | 3 | 1.0-1 | 79 | 49.0 | 33.7 | .075 | 0.090 | 54.5 | 33.0 | 109.1 | .300 | 79.5 |
| 1.0% sodium silicate poured over formed sag cake | 3 | 1.0-1 | 82 | 53.0 | 38.1 | .056 | 0.109 | 66.0 | 29.0 | 117.1 | .309 | 76.6 |
| 1.5% sodium silicate poured over formed sag cake | 3 | 1.0-1 | 75 | 55.6 | 39.5 | .050 | 0.115 | 70.0 | 22.0 | 107.8 | .316 | 75.9 |

[1] Percent of sodium silicate solids based upon dry stock weight.

Although the admixing of the sodium silicate solution with the other materials into the stock slurry did impart improved resistance to deformation or sag, the application of the sodium silicate agent subsequently to the formed asbestos-cement cake under vacuum decidedly enhanced the treatment rendering it one-third more effective at low concentrations which minimizes the possible deleterious effects of sodium silicate upon hydraulic cement compositions.

Moreover, the period of retaining the sodium silicate solution in admixture with the asbestos-cement slurry solids does not appear to have any significant effect upon this particular means of treatment as is demonstrated by the following data of Table II which negates time as a relevant factor in the comparison of the means of this invention with that of the prior art. In these runs, 100 cc. of a solution of 1% "N" grade sodium silicate were used, and the asbestos-cement stock formulation consisted of 20% asbestos fiber, 40% silica, and 40% hydraulic cement composed of 15% Portland cement and 85% hydraulic setting slag.

Accordingly, the retention period of the asbestos-cement slurry containing the sodium silicate solution has no significant or appreciable effect upon the degree of sag.

To more accurately simulate a conventional asbestos-cement wet process machine procedure wherein the white water or liquid phase of the slurry is repeatedly recirculated carrying with it all dissolved matter and the concentration of soluble agents added accumulates or builds up frequently to the detriment of the process and/or machine, a further series of runs comprising such conditions was made with the respective filtrate(s) from each preceding run of that particular series being repeatedly reused for twenty sag cake tests along with a make-up comprising the addition of 100 cc. of a solution of 1.05% "N" grade sodium silicate. The series consisted of a control employing no sodium silicate, the admixing of the sodium silicate solution in the slurry of stock, and the pouring of the sodium silicate solution over the formed sag cake under vacuum, with the respective filtrates being reapplied and in the latter two series with the sodium silicate make-up. The data of these runs is set forth in Table TABLE II.—SODIUM SILICATE SOLUTION ADMIXED IN SLURRY OF ASBESTOS-CEMENT AND EFFECTS OF RETENTION UPON SAG

| 0.7% Sodium Silicate [1] Wet Mix Time | Number of Samples | Silica Cement Ratio | Filter Time, Sec. | Water Retention Percent | | Sag in Inches | Break Load Pounds | Thickness in Inches | Dry Density, pcf. |
|---|---|---|---|---|---|---|---|---|---|
| | | | | Filtration | Press | | | | |
| 1 Minute, standard | 3 | 1.0-1 | 76 | 45.9 | 31.1 | .134 | 100.4 | .290 | 83.9 |
| 3 Minutes | 3 | 1.0-1 | 73 | 49.0 | 33.7 | .128 | 106.3 | .296 | 82.9 |
| 5 Minutes | 3 | 1.0-1 | 71 | 48.9 | 32.5 | .132 | 107.1 | .298 | 82.5 |
| 7 Minutes | 3 | 1.0-1 | 69 | 50.4 | 33.1 | .123 | 104.1 | .299 | 82.3 |

[1] Percent of sodium silicate solids based upon dry stock weight.

III with the sag of each series given as the average sag for all 20 cakes tested.

TABLE III.—SODIUM SILICATE TREATMENT OF ASBESTOS-CEMENT WITH REUSE OF FILTRATE AND EFFECTS OF METHOD OF APPLICATION

| Additive [1] | Number of Samples | Silica Cement Ratio | Filter Time, Sec. | Water Retention percent | | Average Sag in Inches | Sag Reduced in Inches over Control | Percent Sag Reduced over Control | Percent Improvement over Silicate in Stock Slurry | Break Load Pounds | Thickness in Inches | Dry Density, pcf. |
|---|---|---|---|---|---|---|---|---|---|---|---|---|
| | | | | Filtration | Press | | | | | | | |
| None—Control | 20 | 1.0-1 | 83 | 48.0 | 31.5 | .137 | | | | 111.2 | .287 | 84.4 |
| 0.7% Sodium Silicate in stock slurry | 20 | 1.0-1 | 80 | 49.3 | 32.4 | .126 | .011 | 8 | | 105.9 | .292 | 83.0 |
| 0.7% Sodium Silicate poured over formed sag cake under vacuum | 20 | 1.0-1 | 83 | 51.9 | 32.9 | .094 | .043 | 31.5 | 25.4 | 103.2 | .291 | 82.9 |

[1] Percent of sodium silicate solids based upon dry stock weight added to filtrate for each subsequent run.

Example II

The effect of sodium silicate upon hydraulic cement compositions typically being erratic and varying with the composition and/or conditions, particularly with Portland cement with which it frequently exerts a deleterious influence, the effects upon asbestos-cement stocks having compositions of varying ratios of hydraulic setting slag cement and Portland cement within the scope of this invention due to the treatment of this invention in relation to the admixing of the sodium silicate agent with aqueous slurries of the asbestos-cement stocks are illustrated in the following table. The stock formulation, other than the sodium silicate solution which comprised 100 cc. of a solution of 1.05% "N" grade sodium silicate per cake suggested in the literature to exert various effects upon hydraulic setting cements, when applied by assorted techniques including the means of this invention, are compared with asbestos-hydraulic setting slag and Portland cement furnishes and with a standard asbestos-Portland cement furnish such as is employed in many commercial asbestos-cement products. The slag containing asbestos-cement formulations employed in these runs consisted of 20% asbestos fiber, 40% silica, and 40% hydraulic setting cement of the given ratios of slag and Portland cement, and the standard asbestos Portland cement furnish formulation was 20% fiber, 30% silica, and 50% Portland cement. The materials and conditions of these tests and the results thereof are as shown in Table V.

TABLE IV.—SODIUM SILICATE TREATMENT OF ASBESTOS-CEMENT COMPRISING VARYING PROPERTIES OF HYDRAULIC BINDERS AND EFFECT OF METHOD OF APPLICATION

| Slag-Portland Cement Mix [1] | Sag in Inches for Sodium Silicate in Stock Slurry | Sag in Inches for Sodium Silicate Poured over Formed Sag Cake under Vacuum | Difference in Reduction of Slag from Silicate Poured over Formed Cake in Relation to Silicate in Stock Slurry | Percent Improvement of Invention over Silicate in Stock Slurry |
|---|---|---|---|---|
| 85% slag, 15% Portland | .152 | .107 | .045 | 29.6 |
| 75% slag, 25% Portland | .145 | .114 | .031 | 21.4 |
| 65% slag, 35% Portland | .182 | .095 | .087 | 47.8 |
| 55% slag, 45% Portland | .189 | .089 | .100 | 52.9 |
| 45% slag, 55% Portland | .173 | .095 | .088 | 50.9 |

[1] Percent by weight of total hydraulic setting cement components.

test, was 20% fiber, 40% silica, and 40% hydraulic cement of the given slag and Portland ratios. Four sag cake samples were employed in each test and the data represent the average thereof.

Example IV

An example of the sag of a standard asbestos-Portland cement formulation and of a typical asbestos-slag containing cement composition in relation to that of the TABLE V.—EFFECTS OF SODIUM SILICATE AND RELATED HYDRAULIC CEMENT MODIFYING AGENTS UPON ASBESTOS-CEMENT COMPOSITIONS

| | Cement Used Percent Composition | | Additive Used | | Mode of Introducing Agent | Sag in Inches | | | Modulus of Rupture, p.s.i. |
|---|---|---|---|---|---|---|---|---|---|
| | Slag | Portland | Concentration, percent | Type | | 10 min. | 30 min. | 60 min. | |
| Run 1 | 75 | 25 | 2 | CaCl$_2$ | Mix with water | 0.263 | 0.195 | 0.171 | |
| Run 2 | 80 | 20 | 1 | CaCl$_2$ | do | 0.257 | 0.209 | 0.170 | |
| Run 3 | 75 | 25 | 1 | CaCl$_2$ | do | 0.220 | 0.157 | 0.136 | |
| Run 4 | 75 | 25 | 1 | CaCl$_2$ | Pour over cake in vacuum box before 25 lb. weight | 0.353 | 0.251 | 0.259 | |
| Run 5 | 75 | 25 | 2 | NaCl | Mix with water | 0.171 | 0.135 | 0.117 | |
| Run 6 | 75 | 25 | 2 | NaCl | Pour over cake after hand tamping | 0.251 | 0.252 | 0.216 | |
| Run 7 | 75 | 25 | 2 | NaOH | Mix with water | 0.459 | 0.337 | 0.221 | |
| Run 8 | 75 | 25 | 2 | NaOH | Mix with water increased vacuum time 1 min. | 0.211 | 0.133 | 0.060 | 3,630 |
| Run 9 | 75 | 25 | 2 | NaOH | Pour over cake after hand tamping | [1] 0.119 | 0.012 | 0.001 | 3,890 |
| Run 10 | 75 | 25 | 1 | Na$_2$CO$_3$ | do | 0.101 | | 0.058 | 3,740 |
| Run 11 | 80 | 20 | 1 | Na$_2$CO$_3$ | do | 0.074 | | 0.043 | 3,800 |
| Run 12 | 75 | 25 | 2 | Na$_2$CO$_3$ | do | 0.083 | | 0.037 | 3,720 |
| Run 13 | 75 | 25 | 1 | Na$_2$SiO$_3$ | do | 0.063 | | 0.016 | 3,726 |
| Run 14 | 75 | 25 | 2 | Na$_2$SiO$_3$ | do | 0.049 | | 0.006 | 3,670 |
| Run 15 | (2) | (2) | | | | 0.142 | 0.058 | 0.046 | 4,300 |
| Run 16 | (3) | (3) | | | | 0.066 | | 0.004 | 3,530 |
| Run 17 | 75 | 25 | 2 | Na$_2$SiO$_3$ | Pour over cake after hand tamping | 0.041 | | 0.008 | 3,260 |
| Run 18 | 75 | 25 | 2 | Na$_2$SiO$_3$ | do | 0.052 | | 0.008 | 2,990 |
| Run 19 | 75 | 25 | 2 | Na$_2$SiO$_3$ | do | 0.045 | | 0.011 | 3,120 |
| Run 20 | 75 | 25 | 0.5 | Commercial solution sodium silicate | do | 0.064 | | 0.036 | 3,420 |
| Run 21 | 75 | 25 | 2 | do | do | 0.017 | | 0.010 | 3,080 |
| Run 22 | 75 | 25 | 1 | NaOH | do | 0.177 | | 0.075 | 3,360 |
| Run 23 | 75 | 25 | 0.2 | NaOH | do | 0.104 | | 0.048 | 3,740 |
| Run 24 | 75 | 25 | 0.1 | Na$_2$CO$_3$ | do | 0.113 | | 0.063 | 3,270 |
| Run 25 | 75 | 25 | 0.5 | Na$_2$CO$_3$ | do | 0.062 | | 0.031 | 3,540 |
| Run 26 | 75 | 25 | 1.0 | Na$_2$CO$_3$ | do | 0.056 | | 0.027 | 3,710 |
| Run 27 | 75 | 25 | 1 | CaCl$_2$ | do | 0.028 | | 0.017 | 3,390 |
| Run 28 | 75 | 25 | 1 | Commercial solution sodium silicate | do | 0.110 | | 0.061 | 3,230 |
| Run 29 | 75 | 25 | | | | 0.180 | 0.106 | 0.088 | 4,020 |

[1] 15-minute sag because of the slow filtration rate.
[2] All Portland cement (National).
[3] All Portland cement (Keystone).

Example III

The relative effects upon the sag of asbestos-cement composition of sodium silicate solutions and of solutions of other agents which could be presumed analogous to sodium silicate in this application and/or have been same asbestos-slag containing cement composition when treated with a solution of sodium silicate in accordance with the procedure or means of this invention is illustrated by the tests and data thereof set forth in Table VI. Six sag cake samples and runs were made for each composition.

TABLE VI.—COMPARISON OF SAG OF A STANDARD PORTLAND CEMENT FORMULATION WITH A TYPICAL SLAG WITHOUT AND WITH SODIUM SILICATE TREATMENT

| Material | Silica Cement Ratio | Filter Time, Sec. | Water Retention percent | | Sag in Inches | Percent Sodium Silicate Based on Dry Stock |
|---|---|---|---|---|---|---|
| | | | Filtration | Press | | |
| Control:<br>20% fiber<br>30% silica<br>50% Portland | 0.6/1 | 89 | 47.1 | 30.4 | .185 | 0 |
| Slag:<br>No silicate<br>20% fiber<br>40% silica<br>10% Portland<br>30% slag | 1.0/1 | 86 | 42.8 | 29.7 | .189 | 0 |
| Slag:<br>With silicate [1]<br>20% fiber<br>40% silica<br>10% Portland<br>30% slag | 1.0/1 | 85 | 46.7 | 31.6 | .133 | 0.68 |

[1] 100 cc. of a solution of 1% sodium silicate poured over sag cake in filter box.

The reduction of sag in this instance due to the application of the treatment of this invention was approximately 30% over that of an identical slag formulation and an analogous Portland cement formulation.

The following examples illustrate the application of this invention to the manufacture of asbestos-cement pipe on a commercial scale employing conventional or standard wet process pipe forming machines, procedures and conditions including machine speeds and production rates.

*Example V*

A plant scale run comprising the production of 24 in. diameter sewer pipe from a furnish consisting of 290 lbs. of asbestos fiber, 548 lbs. of silica, 137 lbs. of Portland cement, and 413 lbs. of hydraulic setting slag was carried out under normal operating conditions with good formation and shape retention. The measurements, including deviations in cross sectional dimensions or sag, of this pipe are given in the following table with comparable data for a standard asbestos-cement pipe 20 in. in diameter produced from a formula consisting of 225 lbs. of asbestos fiber, 450 lbs. of silica, and 465 lbs. of Portland cement and formed on the same equipment and under like conditions. As the slag containing pipe was of a larger diameter its tendency to sag would normally be greater, but when this pipe was treated during formation by the application of a spray of solution of sodium silicate to the wet sheet of asbestos-slag and Portland cement slurry solids on the machine belt prior to the suction box and accumulation by wrapping about the forming mandrel for the fabrication of the pipe the larger diameter slag containing pipe sagged less than the smaller diameter standard Portland cement containing pipe. In this run the rate of application of the sodium silicate spray to the slag containing pipe was 2.5 gals. per minute of a 7% solution which with a forming rate of about 200 lbs. of stock solids per minute equalled about 0.8% dry sodium silicate based on dry stock, or about 16 lbs. of sodium silicate per 2000 lbs. of stock. An inspection for out of roundness or sag and determination of the outside diameter of the standard 20 in. asbestos-Portland cement pipe and the sodium silicate treated 24 in. asbestos slag and Portland cement pipe resulted in the following data.

TABLE VII.—COMPARISON OF SAG OF A STANDARD PORTLAND CEMENT PIPE WITH SODIUM SILICATE TREATED SLAG CEMENT CONTAINING PIPE

| Number of Pipe Sections Produced | Inspection | Center of Section | | Out of Roundness, in. |
|---|---|---|---|---|
| | | Minimum O.D., in. | Maximum O.D., in. | |
| Standard asbestos-Portland cement pipe 20 inches diameter: | | | | |
| 1 (Standard) | Passed | 21.67 | 21.95 | .28 |
| 2 (Standard) | Rejected [1] | 21.37 | 21.90 | .53 |
| 3 (Standard) | Passed | 21.45 | 21.95 | .50 |
| 4 (Standard) | do | 21.65 | 21.87 | .22 |
| 5 (Standard) | do | 21.68 | 21.85 | .17 |
| 6 (Standard) | do | 21.65 | 21.92 | .27 |
| Average (6 pipe) | | | | .33 |
| Silicate treated asbestos-slag and Portland cement pipe, 24 inches diameter: | | | | |
| 1 (Slag) | Passed | 26.05 | 26.42 | .37 |
| 3 (Slag) | Rejected [2] | 26.03 | 26.47 | .44 |
| 5 (Slag) | Passed | 26.14 | 26.33 | .19 |
| 7 (Slag) | do | 26.05 | 26.27 | .22 |
| 9 (Slag) | do | 26.12 | 26.46 | .34 |
| 10 (Slag) | do | 26.07 | 26.40 | .33 |
| 12 (Slag) | do | 26.18 | 26.35 | .17 |
| 13 (Slag) | do | 26.05 | 26.32 | .27 |
| 14 (Slag) | do | 26.10 | 26.30 | .20 |
| Average (9 pipe) | | | | .28 |

[1] Oval.
[2] Damaged.

Upon air curing for 16 hours followed by steam curing for 16 hours at 100 p.s.i. in an autoclave, selected samples of the standard and slag cement containing pipe were tested for crush strength and dry density. The data are as follows.

TABLE VIII.—CRUSH STRENGTHS OF STANDARD PORTLAND CEMENT PIPE AND SODIUM SILICATE TREATED SLAG CEMENT CONTAINING PIPE

| Number of Pipe Sections Tested | Wall Thick., inches | Inside Diameter, inches | Break Load, Lbs. | Modulus of Rupture, p.s.i. | Dry Density Lbs./Cu. Ft. |
|---|---|---|---|---|---|
| Standard asbestos-Portland cement pipe, 20 inches diameter: | | | | | |
| 1 (Standard) | .89 | 19.93 | 3,500 | 7,400 | 107.5 |
| 4 (Standard) | .89 | 19.90 | 3,150 | 6,620 | 109.4 |
| 6 (Standard) | .84 | 19.95 | 2,950 | 6,940 | 107.9 |
| Average | .87 | 19.92 | 3,300 | 6,987 | 108.3 |
| Silicate treated asbestos-slag and Portland cement pipe, 24 inches diameter: | | | | | |
| 5 (Slag) | 1.15 | 23.94 | 5,050 | 7,670 | 105.0 |
| 9 (Slag) | 1.15 | 23.93 | 4,750 | 7,200 | 106.5 |
| Average | 1.15 | 23.93 | 4,900 | 7,435 | 105.8 |

*Example VI*

The relative strength properties of hydraulic setting slag containing asbestos-cement pipe products both untreated and sodium silicate treated according to this invention compared with a standard commercial asbestos-Portland cement pipe are illustrated by the following data. It should be kept in mind that hydraulic setting slag containing compositions are generally lighter in density than Portland cement compositions and in turn inherently lower in strength, and also that sodium silicate is normally considered to degrade the physical properties, particularly strength properties, of hydraulic cements. Nevertheless, this data demonstrates that although the slag containing products of this invention are in general insignificantly lower in strength than corresponding Portland cement products, the sodium silicate treatment as applied according to this invention does not impart or result in discernible strength reductions or other deleterious effects. In all manufacturing runs from which this data was derived the production rates were normal and the formation satisfactory. The standard asbestos-Portland cement pipe furnish consisted of 20% asbestos fiber, 30% silica, and 50% Portland cement, and the asbestos-slag cement furnishes of the special runs consisted of 20% asbestos fiber, 40% silica, and 40% hydraulic setting Portland cement. When employed, sodium silicate was applied as a spray of 1% solution at a rate of 2.5 gals. per minute. Curing the pipe was carried out by a 16 hour retention period indoors followed by wetting down and steam autoclaving at 110 p.s.i. for 16 hours. The production and strength data for 6 in. pipe produced first from a standard Portland cement formulation, then a slag containing cement formulation, followed by a silicate treated slag containing cement formulation prior to returning to the standard Portland cement formulation of the given compositions and conditions are as follows:

TABLE IX.—RELATIVE STRENGTH PROPERTIES OF STANDARD PORTLAND CEMENT PIPE AND SLAG CEMENT CONTAINING PIPE BOTH UNTREATED AND SODIUM SILICATE TREATED

| | Standard Before Special Run No Silicate | Special Run A No Silicate | Special Run B No Silicate | Special Run C Silicate Spray | Standard After Special Run No Silicate |
|---|---|---|---|---|---|
| Routine Recovery: | | | | | |
| No. of sections inspected | 119 | 67 | 54 | 73 | 189 |
| Inspection rejects, oval | 7 | 1 | 0 | 0 | 0 |
| Thin wall | 0 | 1 | 0 | 0 | 0 |
| Bad machining | 0 | 2 | 0 | 0 | 0 |
| Broke on lathe | 1 | 0 | 0 | 0 | 0 |
| Damage wet | 0 | 0 | 1 | 0 | 0 |
| Equipment failure | 0 | 0 | 1 | 0 | 0 |
| Total inspection rejects | 8=6.7% | 4=6.0% | 2=3.6% | 0=0.0% | 0=0.0% |
| Flexure rejects | 0=0.0% | 1=1.5% | 3=5.4% | 0=0.0% | 0=0.0% |
| Hydrostatic rejects | 2=1.7% | 2=3.0% | 0=0.0% | 0=0.0% | 0=0.0% |
| Total rejects, 1st time through | 10=8.4% | 7=11.4% | 5=8.9% | 0=0.0% | 0=0.0% |
| Ultimate Strength Tests: | | | | | |
| No. of hydrostatic tests | 10 | 9 | 7 | 8 | 10 |
| Maximum MR, lb./in.$^2$ | 4,310 | 4,150 | 4,280 | 4,040 | 4,210 |
| Minimum MR, lb./in.$^2$ | 3,810 | 3,730 | 3,570 | 3,430 | 3,900 |
| Average MR, lb./in.$^2$ | 4,120 | 3,980 | 3,760 | 3,850 | 4,100 |
| No. of Flexure Tests | 10 | 9 | 7 | 8 | 11 |
| Maximum MR, lb./in.$^2$ | 4,250 | 3,870 | 3,890 | 4,020 | 4,370 |
| Minimum MR, lb./in.$^2$ | 3,660 | 3,420 | 3,150 | 3,600 | 3,570 |
| Av3rage MR, lb./in.$^2$ | 3,950 | 3,610 | 3,560 | 3,790 | 3,900 |
| No. of Crush Tests | 10 | 9 | 7 | 8 | 11 |
| Maximum MR, lb./in.$^2$ | 8,020 | 7,800 | 6,840 | 7,800 | 8,100 |
| Minimum MR, lb./in.$^2$ | 6,930 | 6,250 | 6,360 | 6,640 | 6,920 |
| Average MR, lb./in.$^2$ | 7,430 | 7,100 | 6,620 | 7,210 | 7,590 |

*Example VII*

The sag and strength of 8 in. diameter pipe produced from a hydraulic setting slag containing formulation both without and with the sodium silicate treatment of this invention were evaluated and compared with the like properties of pipe produced from the same hydraulic setting slag containing formulation when treated with sodium carbonate and a standard Portland cement formulation. These tests produced the data of the following tables. The slag cement pipe was formed from a stock slurry of 20% asbestos fiber, 40% silica, 10% Portland cement, and 30% hydraulic setting slag, and the Portland cement pipe was formed from a stock slurry of 20% asbestos fiber, 30% silica, and 50% Portland. The relative sag of the 8 in. pipe produced from these formulations was determined by measuring the inside vertical diameter of a one foot long section of green or uncured pipe of the given age and upon applying a centered, vertical load of 33½ lbs. per ft. perpendicular to the length of the pipe sample, then taking a second like measurement of the inside vertical diameter of the pipe sample section. The resulting sag data is set forth in the following table.

TABLE X.—RELATIVE SAG OF PIPE FORMED FROM PORTLAND CEMENT AND SLAG CEMENT BOTH UNTREATED AND TREATED WITH SODIUM SILICATE OR SODIUM CARBONATE.

| Phase | I.D. Before Load, Inches | I.D. After Load, Inches | Difference in I.D., Inches | Age of Pipe, Hours | Wall Thickness, Inches |
|---|---|---|---|---|---|
| Portland cement, no treatment | 7.84 | 6.75 | 1.09 | 1½ | 0.37 |
| Slag cement, no treatment | 7.93 | 7.74 | 0.19 | 2 | 0.38 |
| Slag pipe, 2% solium silicate spray treatment during manufacture | 7.91 | 7.86 | 0.05 | 2½ | 0.34 |
| Slag pipe, 1% sodium carbonate spray treatment during manufacture | 7.83 | (¹) | | 1 | 0.37 |

¹ Collapsed.

When tested for strength characteristics pipe of the foregoing formulations, cured under identical conditions, exhibited the following strength characteristics:

TABLE XI.—RELATIVE STRENGTH PROPERTIES OF STANDARD PORTLAND CEMENT PIPE AND SLAG CEMENT CONTAINING PIPE BOTH UNTREATED AND TREATED WITH SODIUM SILICATE OR SODIUM CARBONATE

| Phase | Form Time (sec.) | Hydrostatic MR (p.s.i.) | Flexure MR (p.s.i.) | Normal Crush MR, p.s.i. | Saturated Crush MR, p.s.i. | Density, pcf. | Water Absorption, percent |
|---|---|---|---|---|---|---|---|
| Slag, min | 79 | 3,760 | 3,790 | 7,730 | 7,530 | 96.7 | 24.0 |
| 2% Sodium, max | 97 | 4,750 | 4,780 | 8,670 | 8,100 | 100.4 | 26.0 |
| Silcate spray, avg | 89(17) | 4,400(6) | 4,360(7) | 8,150(7) | 7,820(4) | 98.7(4) | 25.0(4) |
| Slag, min | 70 | 3,850 | 4,100 | 6,560 | 7,080 | | |
| No spray, max | 83 | 3,880 | 4,230 | 6,820(2) | 7,550(1) | 102.3(1) | 22.7(1) |
| Avg | 76(7) | 3,870(2) | 4,160(2) | | | | |
| Slag, min | 73 | 4,120 | 3,230 | 6,790 | | | |
| 1% Sodium, max | 82 | 4,650 | 3,900 | 7,920 | | | |
| Silicate spray, avg | 77(7) | 4,400(4) | 3,610(3) | 7,400(3) | 7,590(1) | 99.4(1) | 24.4(1) |
| Standard, min | 77 | 3,790 | 4,000 | 7,320 | 6,880 | 109.1 | 17.7 |
| Portland, max | 91 | 4,720 | 4,830 | 8,660 | 7,930 | 111.4 | 19.4 |
| No spray, avg | 85(26) | 4,120(11) | 4,500(12) | 7,980 (11) | 7,360(11) | 111.1(10) | 18.3(10) |
| Slag, min | 74 | 3,580 | 3,960 | | 6,460 | 105.9 | 19.9 |
| No spray, max | 91 | 3,920 | 4,390 | | 6,890 | 106.6 | 20.1 |
| Avg | 78(6) | 3,750(2) | 4,170(2) | 8,030(1) | 6,680(2) | 106.3(2) | 20.0(2) |
| Slag, min | 51 | 2,360 | 2,600 | 5,670 | 5,110 | 98.2 | 21.0 |
| 1% Sodium, max | 85 | 3,680 | 3,770 | 7,350 | 6,850 | 104.0 | 24.4 |
| Carbonate, avg | 63(23) | 3,050(11) | 3,310(10) | 6,660(9) | 6,190(10) | 102.2(9) | 22.1(9) |

NOTE: Figures in parentheses are number of pipe samples tested.

Bars measuring 10 in. x ½ in. x ½ in. were cut from selected samples of these pipes including the standard asbestos-cement pipe and the hydraulic setting slag containing pipe formed both without and with the sodium silicate spray treatment for impact strength tests. These tests produced the following:

TABLE XII.—IMPACT STRENGTH DATA FOR STANDARD PORTLAND CEMENT PIPE AND SLAG CEMENT CONTAINING PIPE BOTH TREATED WITH SODIUM SILICATE AND UNTREATED

Standard asbestos-Portland cement:
    Average impact strength, ft.-lb. _____ 0.465
    Standard deviation, ft.-lb. _____ 0.080
    Range, ft.-lb. _____ 0.350–0.600
    Moisture content percent dry weight ___ 2.36

Slag containing pipe with sodium silicate spray:
    Average impact strength, ft.-lb. _____ 0.650
    Standard deviation, ft.-lb. _____ 0.064
    Range, ft.-lb. _____ 0.530–0.720
    Moisture content percent dry weight ___ 1.51
Slag containing pipe without sodium silicate spray:
    Average impact strength, ft.-lb. _____ 0.601
    Standard deviation, ft.-lb. _____ 0.075
    Range, ft.-lb. _____ 0.470–0.740
    Moisture content percent dry weight ___ 1.73

These tests indicate that the sodium slicate treated slag containing composition has the highest impact strength and although the silicate spray adds little to the impact strength of the slag cement, viz., an increase of from 0.601 per lb. to 0.650 per lb., the treatment does reduce the variability in impact strength as is indicated by the lower standard deviation and range.

*Example VIII*

Additional runs comprising the manufacture of 8 in. diameter pipe of several compositions for a direct comparison of the effects of the sodium silicate treatment upon the sag in each composition were carried out including the utilization of cements of different particle size. The formulations employed comprised as a standard a conventional Portland cement furnish of 20% asbestos fiber, 30% silica, and 50% Portland cement, and for the hydraulic setting slag containing cements a fine slag furnish of 20% fiber, 40% silica, 10% Portland, and 30% slag having a Blaine classification of 5370 cm.²/gm. (St. Louis slag) and a coarse slag furnish of 20% asbestos fiber, 20% Portland cement, and 60% slag having a Blaine fineness of 4470 cm.²/gm. (St. Louis slag). Eight inch pipe were produced from the foregoing compositions and tested as in Example VII. Namely, the inside vertical diameter of one foot long sample sections of uncured two hour old pipe was determined both before and after the like application of a centered, vertical load of given weight per foot. The results are given in Table XIII.

specific surface of approximately 4000 to 6500 cm.²/gm., and optimumly 4400 to 5400 cm.²/gm., as derived by the Blaine test. Five exemplary hydraulic setting slag cement products produced from ordinary water quenched blast furnace slags gave the following analysis:

|  | A | B | C | D | E |
|---|---|---|---|---|---|
| Ignition loss (at 1,000° F.) | 0.47 | 0.55 | -------- | -------- | [1] 1.7 |
| $SiO_2$ | 26.7 | 27.8 | 30.3 | 34.3 | 33.3 |
| CaO | 45.3 | 44.3 | 41.6 | 43.1 | 39.2 |
| MgO | 4.2 | 3.4 | 4.1 | 6.3 | 12.3 |
| $Al_2O_3$ | 11.8 | 12.0 | 14.4 | 10.2 | 10.7 |
| $TiO_2$ | 0.56 | 0.56 | 0.54 | 0.4 | 0.28 |
| $Fe_2O_3$ | 0.83 | 1.3 | 0.86 | 2.28 | 0.72 |
| $P_2O_5$ | 0.43 | 0.45 | 0.10 | 0.15 | 0.009 |
| $Na_2O$ | 0.56 | 0.45 | 0.34 | 0.19 | 0.19 |
| $K_2O$ | 0.49 | 0.53 | 1.1 | 0.19 | 0.17 |
| Total $SO_3$ | 7.5 | 6.9 | 5.92 | 0.09 | 0.22 |
| S— | 0.89 | 0.91 | 0.95 | 1.41 | 1.2 |
| Trace materials ($B_2O_3$, BaO, $Mn_2O_3$) | 0.3 | 0.3 | -------- | -------- | 0.8 |
|  | 100.0% | 99.9% | 100.21% | 100.21% | 100.79% |

[1] At 1,800° F.

Moreover, to achieve the maximum advantages resulting from the utilization of a hydraulic setting slag, including the economics due to lower material costs and the TABLE XIII.—RELATIVE SAG OF PIPE FORMED FROM PORTLAND CEMENT AND FROM FINE OR COARSE SLAG CEMENTS BOTH WITH AND WITHOUT SODIUM SILICATE TREATMENT

| Pipe Composition | Number of Pipe and Average | Difference in Inside Diameter After Load of— | | Wall Thickness, Inches |
|---|---|---|---|---|
|  |  | 11.86 lbs. | 38.81 lbs. |  |
| Portland cement, no treatment | 2 | 0.033 in | 0.155 in | 0.61 |
| Fine slag, no treatment | 1 | 0.035 | 1.525 | 0.58 |
| Portland cement, 1% sodium silicate spray | 2 | 0.023 | 0.176 | 0.58 |
| Fine slag, 1% sodium silicate spray | 2 | 0.056 | 0.171 | 0.62 |
| Coarse slag, 1% sodium silicate spray | 2 | 0.026 | 0.138 | 0.65 |

The strength characteristics of these pipe, upon air curing 24 hours and steam curing 20 hours at 110 p.s.i. were as follows:

increased usage of silica in the stock formulation as well as enhanced properties of the ultimate product such as greater chemical resistance, the slag cements should be TABLE XIV.—RELATIVE STRENGTH PROPERTIES OF PIPE FORMED FROM PORTLAND CEMENT AND FROM FINE AND COARSE SLAG CEMENTS BOTH WITH AND WITHOUT SODIUM SILICATE TREATMENT

| Pipe Composition | Form Time (sec.) | Hydrostatic MR (p.s.i.) | Flexure MR (p.s.i.) | ME×10⁶, p.s.i. | Normal Crush MT, p.s.i. | Saturated Crush MR, p.s.i. | Density, pcf. | Water Absorption, percent |
|---|---|---|---|---|---|---|---|---|
| Portland cement, min | 48 | 4170 | 5100 | 2.69 | 7270 | 7320 | 109.8 | 17.8 |
| No treatment, max | 60 | 5500 | 6160 | 3.32 | 9640 | 9060 | 111.5 | 19.0 |
| Avg | 55(28) | 4940(11) | 5700(14) | 2.99(14) | 8940(14) | 7600(13) | 110.5(12) | 18.2(12) |
| Fine slag, min | 42 | 4100 | 4460 | 2.06 | 6300 | 5660 | 103.1 | 19.3 |
| No treatment, max | 54 | 4450 | 5260 | 2.78 | 8880 | 7900 | 107.4 | 20.9 |
| Avg | 49(26) | 4340(4) | 4970(13) | 2.40(13) | 7550(13) | 6700(13) | 104.7(11) | 20.3(11) |
| Portland cement, min | 38 | 2070 | 4090 | 2.15 | 6090 | 5660 | 99.7 | 19.7 |
| 1% Sodium silicate spray, max | 56 | 3450 | 5160 | 2.74 | 9150 | 7660 | 107.3 | 23.3 |
| Avg | 47(28) | 2800(13) | 4770(12) | 2.49(12) | 7480(12) | 6700(12) | 104.2(11) | 21.2(11) |
| Fine slag, min | 44 | 3720 | 4090 | 1.85 | 6690 | 5750 | 96.6 | 21.1 |
| 1% Sodium silicate spray, max | 55 | 4560 | 5230 | 2.32 | 8930 | 7370 | 102.7 | 24.3 |
| Avg | 48(35) | 4200(12) | 4840(16) | 2.11(15) | 7690(15) | 6670(16) | 99.7(16) | 22.7(16) |
| Coarse, slag, min | 50 | 3240 | 3410 | 2.18 | 7250 | 6230 | 104.5 | 19.1 |
| 1% Sodium silicate spray, max | 69 | 4010 | 3990 | 2.53 | 8440 | 7000 | 109.2 | 21.2 |
| Avg | 56(22) | 3540(9) | 3710(10) | 2.38(9) | 7790(10) | 6770(10) | 106.5(10) | 20.7(10) |

NOTE: Figures in parentheses are number of pipe in average.

The hydraulic setting slag containing compositions which comprise the major cementitious component or phase of the asbestos-cement formulations or stock utilized in the practice of this invention comprise, for example, granulated or quenched blast furnace slags or slags of similar metallurgical processes which are of a predominantly glassy nature or unoriented in structure, preferably containing no more than about 5% by weight thereof of crystalline structure. To facilitate the hydration reaction, these slags are preferably finely ground to a size having a employed as the major cementitious component or phase of the over-all system, that is at least about 50 parts by weight of the hydraulic setting cementitious ingredients up to about 95 parts by weight thereof and preferably about 75 to 85 parts by weight, with the balance comprising portland cement, lime, or appropriate sources of lime.

It will be understood that the foregoing details are given for purposes of illustration and not restriction, and

I claim:

1. The method of manufacturing asbestos-slag cement products comprising, dispersing an asbestos-hydraulic slag cement stock furnish in water forming a dilute aqueous slurry of the solids thereof, said hydraulic slag cement component of the stock furnish comprising at least approximately 50% by weight of hydraulic setting slag cement, forming a thin wet sheet of the slurry solids comprising the hydraulic cement upon a porous member, applying an aqueous solution of sodium silicate to the thin wet sheet of slurry solids in amount of approximately 0.125% to 5.0% by weight of sodium silicate solids based upon the asbestos-hydraulic slag cement stock furnish solids content of the wet sheet, said application of sodium silicate solids being prior to consolidation of the said thin wet sheet whereby the sodium silicate solution is distributed throughout the same, superimposing layers of the wet sodium silicate containing sheet of slurry solids into a laminated structure and consolidating the laminated structure integrating the layers thereof.

2. The method of manufacturing asbestos-slag cement products comprising, dispersing an asbestos-hydraulic slag cement stock furnish in water forming a dilute aqueous slurry of the solids thereof, said asbestos-hydraulic slag cement stock furnish comprising asbestos fiber, silica, and hydraulic setting slag cement comprising approximately 50 to 95 parts by weight of hydraulic setting slag cement and approximately 5 to 50 parts by weight of at least one source of lime selected from the group consisting of lime and Portland cement, forming a thin wet sheet of the slurry solids comprising the asbestos fiber, silica and hydraulic setting cement upon a porous member, applying an aqueous solution of sodium silicate to the thin wet sheet of slurry solids in amount of approximately 0.125% to 5.0% by weight of sodium silicate solids based upon the asbestos-hydraulic slag cement stock furnish solids content of the slurry, said application of sodium silicate solids being prior to consolidation of the said thin wet sheet whereby the sodium silicate solution is distributed throughout the same, removing the wet sodium silicate containing sheet of the slurry solids from the porous member, superimposing layers of the wet sodium silicate containing sheet of slurry solids into a laminated structure and consolidating the structure integrating the layers thereof.

3. The method of manufacturing asbestos-slag cement products comprising, dispersing an asbestos-hydraulic slag cement stock furnish in water forming a dilute aqueous slurry of the solids thereof, said hydraulic slag cement component of the stock furnish comprising at least approximately 50% by weight of hydraulic setting slag cement together with at least one source of lime selected from the group consisting of lime and Portland cement in amount of at least approximately 5% by weight thereof, forming a thin wet sheet of the slurry solids comprising the hydraulic setting cement upon a porous member, applying a spray of an aqueous solution of sodium silicate to the thin wet sheet of slurry solids in amount of approximately 0.5% to 2% by weight of sodium silicate solids based upon the asbestos-hydraulic slag cement stock furnish solids content of the slurry, said application of sodium silicate solids being prior to consolidation of the said thin wet sheet, withdrawing water from the wet sheet of slurry solids with reduced pressures and thereby drawing the sodium silicate solution throughout the wet sheet of slurry solids, convoluting the wet sheet upon a roll under pressure consolidating the convoluted sheet and integrating the layers thereof.

4. The method of manufacturing asbestos-slag cement products comprising, dispersing an asbestos-hydraulic slag cement stock furnish in water forming a dilute aqueous slurry of the solids thereof, said asbestos-hydraulic slag cement stock furnish comprising approximately 10 to approximately 30% by weight of asbestos fiber, approximately 20 to approximately 50% by weight of silica and approximately 30 to approximately 60% by weight of hydraulic setting cement consisting essentially of approximately 50 to approximately 95 parts by weight of hydraulic setting slag cement and approximately 5 to approximately 50 parts by weight of Portland cement, forming a thin wet sheet of the slurry solids comprising the asbestos fiber, silica and hydraulic setting cement upon a porous member, applying an aqueous solution of sodium silicate to the thin wet sheet of slurry solids in amount of approximately 0.125% to approximately 5% by weight of sodium silicate solids based upon the asbestos-hydraulic slag cement stock furnish solids content of the slurry, said application of sodium silicate solids being prior to consolidation of the said thin wet sheet whereby the sodium silicate solution is distributed throughout the same, superimposing layers of the wet sodium silicate containing sheet of the slurry solids into a laminated structure and consolidating the structure integrating the layers thereof.

5. The method of manufacturing asbestos-slag cement products comprising, dispersing an asbestos-hydraulic slag cement stock furnish in water forming a dilute aqueous slurry of the solids thereof, said asbestos-hydraulic slag cement stock furnish comprising approximately 10 to approximately 30% by weight of asbestos fiber, approximately 20 to approximately 50% by weight of silica and approximately 30 to approximately 60% by weight of hydraulic setting slag cement consisting essentially of approximately 50 to approximately 95 parts by weight of hydraulic setting slag cement and approximately 5 to approximately 50 parts by weight of Portland cement, forming a thin wet sheet of the slurry solids comprising the asbestos fiber, silica and hydraulic setting cement upon a porous felt, applying a spray of an aqueous solution of sodium silicate to the wet sheet in amount of approximately 0.5% to approximately 2% by weight of the sodium silicate solids based upon the asbestos-hydraulic slag cement stock furnish solids content of the slurry, said application of sodium silicate solids being prior to consolidation of the said thin wet sheet, withdrawing water from the wet sheet of slurry solids with reduced pressures and thereby drawing the sodium silicate solution throughout the wet sheet of slurry solids, transferring the wet sheet to a roll, convoluting the wet sheet upon the roll under pressure consolidating the convoluted sheet and integrating the layers thereof.

6. The method of manufacturing asbestos-slag cement pipe comprising, dispersing an asbestos-hydraulic slag cement stock furnish in water forming a dilute aqueous slurry of the solids thereof, said asbestos-hydraulic slag cement stock furnish comprising approximately 20% by weight of asbestos fiber, approximately 30% to approximately 40% by weight of silica and approximately 40% to approximately 50% by weight of hydraulic setting slag cement consisting essentially of approximately 75 to approximately 85 parts by weight of hydraulic setting slag cement and approximately 15 to approximately 25 parts by weight of Portland cement, forming a thin wet sheet of the slurry solids comprising the asbestos fiber, silica and hydraulic setting cement upon a porous felt, applying a spray of an aqueous solution of sodium silicate to the wet sheet in amount of approximately 1% by weight of sodium silicate solids based upon the asbestos-hydraulic slag cement stock furnish solids content of the slurry, said application of sodium silicate solids being prior to consolidation of the said thin wet sheet, withdrawing water from the wet sheet of slurry solids with reduced pressures and thereby drawing the sodium silicate solution throughout the wet sheet of slurry solids, transferring the wet sheet to a roll, convoluting the wet sheet upon the roll under pressure consolidating the convoluted sheet and integrating the layers thereof, then autoclaving the thus produced asbestos-cement pipe.

7. The asbestos-slag cement product of the method of claim 1.

References Cited by the Examiner

UNITED STATES PATENTS

| | | | |
|---|---|---|---|
| 155,176 | 9/1874 | Bartlett | 117—126 |
| 1,829,187 | 10/1931 | Piessevaux | 162—265 |
| 2,006,392 | 7/1935 | Greider et al. | 162—184 |
| 2,184,619 | 12/1939 | Leonard | 162—265 |
| 2,347,684 | 5/1944 | Hatch et al. | 117—126 |
| 2,350,030 | 5/1944 | Greider et al. | 117—126 |
| 2,791,159 | 5/1957 | Lillis | 162—154 |
| 3,173,831 | 3/1965 | Pundsack et al. | 162—154 |

FOREIGN PATENTS 908,125   10/1962   Great Britain.

DONALL H. SYLVESTER, *Primary Examiner.*

S. LEON BASHORE, *Examiner.*

UNITED STATES PATENT OFFICE
CERTIFICATE OF CORRECTION

Patent No. 3,269,888                                August 30, 1966

Julie Chi-Sun Yang

It is hereby certified that error appears in the above numbered patent requiring correction and that the said Letters Patent should read as corrected below.

Columns 7 and 8, Table I, in the title, for "TRATEMENT" read -- TREATMENT --; same Table I, under Break Load Pounds for "109 1" read -- 109.1 --; column 11, line 41, for "465" read -- 645 --; columns 13 and 14, Table VIII, under Break Load Pounds for "3,300" read -- 3,200 --; Table IX, first column under No. of Flexure Tests, for "Av3rage MR, lb/in.$^2$" read -- Average MR, lb./in.$^2$ --; same columns, Table IX, under Special Run C Silicate Spray, for "7,210" read -- 7,120 --; column 14, line 1, strike out "cement consisting of 75% hydraulic setting slag and 25%"; same column 14, between lines 24 and 25, insert -- cement consisting of 75% hydraulic setting slag and 25% --.

Signed and sealed this 15th day of August 1967.

(SEAL)
Attest:

EDWARD M. FLETCHER, JR.                        EDWARD J. BRENNER
Attesting Officer                                  Commissioner of Patents